United States Patent
Ushio et al.

(10) Patent No.: US 8,062,457 B2
(45) Date of Patent: Nov. 22, 2011

(54) METHOD FOR PRODUCING SURFACE PROTECTION PLATE FOR LIQUID CRYSTAL DISPLAYS AND METHOD FOR PRODUCING LIQUID CRYSTAL DISPLAY

(75) Inventors: Seiji Ushio, Tokyo (JP); Yoshihisa Kimura, Tokyo (JP); Hikaru Nishinaga, Tokyo (JP)

(73) Assignee: Kimoto Co., Ltd., Tokyo (JP)

( * ) Notice: Subject to any disclaimer, the term of this patent is extended or adjusted under 35 U.S.C. 154(b) by 279 days.

(21) Appl. No.: 12/087,259

(22) PCT Filed: Dec. 25, 2006

(86) PCT No.: PCT/JP2006/325794
§ 371 (c)(1),
(2), (4) Date: Jun. 30, 2008

(87) PCT Pub. No.: WO2007/080774
PCT Pub. Date: Jul. 19, 2007

(65) Prior Publication Data
US 2009/0000728 A1    Jan. 1, 2009

(30) Foreign Application Priority Data
Jan. 12, 2006  (JP) ................................ 2006-004541

(51) Int. Cl.
*B32B 37/12* (2006.01)
*B32B 38/04* (2006.01)
*B32B 27/36* (2006.01)

(52) U.S. Cl. ......... 156/250; 428/339; 428/354; 428/480
(58) Field of Classification Search .................. 156/250; 428/480, 332, 337, 339, 354
See application file for complete search history.

(56) References Cited

U.S. PATENT DOCUMENTS

| 5,155,005 | A * | 10/1992 | Sato et al. ..................... 430/257 |
| 6,800,378 | B2 * | 10/2004 | Hawa et al. .................. 428/688 |
| 6,841,190 | B2 * | 1/2005 | Liu et al. ......................... 427/64 |
| 7,658,992 | B2 * | 2/2010 | Satake et al. .................. 428/341 |
| 2002/0122925 | A1 * | 9/2002 | Liu et al. ...................... 428/212 |
| 2006/0023147 | A1 * | 2/2006 | Wasai et al. .................. 349/117 |

FOREIGN PATENT DOCUMENTS

| JP | 57-130014 | 8/1982 |
| JP | 2002-060234 | 2/2002 |
| JP | 2006-103169 | 4/2006 |
| WO | WO 02/067044 | 8/2002 |
| WO | WO2005/114270 | * 12/2005 |

* cited by examiner

*Primary Examiner* — Katarzyna Wyrozebski Lee
*Assistant Examiner* — Scott W Dodds
(74) *Attorney, Agent, or Firm* — Bacon & Thomas, PLLC

(57) ABSTRACT

At least two or more plastic films are adhered via an adhesive layer or layers to produce a laminate plate having a total thickness of the plastic films of 250 to 700 μm, and then the laminate plate is subjected to die cutting to obtain a surface protection plate 5. The thickness of each plastic film is preferably chosen to be 50 to 400 μm. A surface protection plate having superior rigidity can be thereby easily produced with a smaller thickness. The thus obtained surface protection plate 5 can be suitably used as the surface protection plate 5 of the liquid crystal display 6.

4 Claims, 1 Drawing Sheet

METHOD FOR PRODUCING SURFACE PROTECTION PLATE FOR LIQUID CRYSTAL DISPLAYS AND METHOD FOR PRODUCING LIQUID CRYSTAL DISPLAY

TECHNICAL FIELD

The present invention relates to a method for producing a surface protection plate for liquid crystal displays, which enables easy production of a surface protection plate with enhancing rigidity of the plate and making the thickness of the plate thinner. The present invention also relates to a method for producing a liquid crystal display, which enables easy production of a liquid crystal display not showing blur on display due to deflection of surface protection plate in spite of use of a thin surface protection plate.

BACKGROUND ART

On surfaces of liquid crystal displays of PC monitors, televisions, cellular phones and so forth, surface protection plates such as those consisting of glass plates or plastic plates are provided. Since plastic plates have more superior shatterproof property compared with glass plates, they are widely used.

Such surface protection plates consisting of plastic plates are produced by cutting original plastic plates with laser (refer to Patent document 1).

Patent document 1: Japanese Patent Unexamined Publication (KOKAI) No. 2002-60234 (claims)

DISCLOSURE OF THE INVENTION

Object to be Achieved by the Invention

However, it is difficult to perform simultaneous processing of multiple plates or large area by laser cutting, and if thickness of original plastic plate is large, cutting takes time. Therefore, it is desired to use a thinner original plastic plate in view of processing suitability. However, if a thin original plastic plate is used, there arises a problem that the plate should have poor rigidity, and therefore the surface protection plate is deflected by touching to cause blur of images.

Moreover, thinner liquid crystal displays (especially those for cellular phones) as a whole are desired, and demand for thinner surface protection plates is rapidly increasing.

Therefore, an object of the present invention is to provide a method for producing a surface protection plate for liquid crystal displays, which enables production of a surface protection plate having superior rigidity with making the thickness of the plate thinner. Another object of the present invention is to provide a method for producing a liquid crystal display, which enables easy production of a liquid crystal display not showing blur on display screen due to deflection of surface protection plate by touching on the display surface in spite of use of a thin surface protection plate.

Means for Achieving the Object

The method for producing a surface protection plate for liquid crystal displays of the present invention, with which the aforementioned object is achieved, comprises adhering at least two or more of plastic films via an adhesive layer or adhesive layers to prepare a laminate plate having a total thickness of the plastic films of 250 to 700 μm and then subjecting the laminate plate to die cutting to obtain the protection plate.

In the method for producing a surface protection plate for liquid crystal displays of the present invention, three of the plastic films are preferably used in the preparation step of the laminate plate.

In the method for producing a surface protection plate for liquid crystal displays of the present invention, each of the plastic films preferably has a thickness of 50 to 400 μm.

In the method for producing a surface protection plate for liquid crystal displays of the present invention, at least two or more of biaxially-stretched polyethylene terephthalate films are preferably used as the plastic films.

Further, the method for producing a liquid crystal display of the present invention comprises producing a surface protection plate for liquid crystal displays by the method for producing a surface protection plate for liquid crystal displays of the present invention, and installing the surface protection plate as a surface protection plate for protecting a display surface of a liquid crystal display.

Effect of the Invention

According to the method for producing a surface protection plate for liquid crystal displays of the present invention, a surface protection plate having superior rigidity can be easily produced with a small thickness, and a laminate plate serving as an original plate of the protection plate is not broken during the production.

Moreover, according to the method for producing a liquid crystal display of the present invention, there can be easily produced a liquid crystal display not showing blur of images due to deflection of surface protection plate caused by touching the display surface in spite of use of a thin surface protection plate and unlikely to suffer from breakage of surface protection plate by impact.

BEST MODE FOR CARRYING OUT THE INVENTION

First, the method for producing a surface protection plate for liquid crystal displays of the present invention will be explained.

The method for producing a surface protection plate for liquid crystal displays of the present invention comprises adhering at least two or more of plastic films via an adhesive layer or adhesive layers to prepare a laminate plate having a total thickness of the plastic films of 250 to 700 μm, and subjecting the laminate plate to die cutting to obtain the protection plate. Embodiments of the elements will be explained below.

First, the step of adhering at least two or more of plastic films via an adhesive layer or adhesive layers to prepare a laminate plate having a total thickness of the plastic films of 250 to 700 μm is performed.

According to the present invention, by adhering at least two or more of plastic films via an adhesive layer or adhesive layers to prepare a laminate plate having a total thickness of the plastic films of 250 to 700 μm, preferably 300 to 650 μm, more preferably 350 to 600 μm, as described above, and using the laminate plate as a material of protection plate, rigidity of the protection plate can be made sufficient, and breakage of the plate can be prevented during the die cutting of the laminate plate. That is, according to the present invention, sufficient rigidity of the protection plate can be obtained by a large thickness of the laminate plate, and breakage of the laminate plate can be prevented during the die cutting in spite of the large thickness of the laminate plate. It is considered that the reason why the laminate plate can be made unlikely to be broken is that each plastic film has a thickness allowing easy die cutting of the film, and the adhesive layer or layers absorb impact at the time of the die cutting. Moreover, since the adhesive layer or layers absorb impact, a completed protection plate also becomes unlikely to be broken. If a large thickness is obtained with one plastic film, not by adhering plastic films, impact cannot be absorbed, and the plate becomes likely to be broken at the time of the die cutting.

The plastic films constituting the laminate plate may consist of at least two films, or three or more films. The number of the plastic films is preferably 3.

As the plastic films, various kinds of transparent plastic films including polyester type films such as those of polyethylene terephthalate, polybutylene terephthalate and polyethylenenaphthalate, and polycarbonate, polyethylene, polypropylene, polystyrene, triacetyl cellulose, acrylic resin, polyvinyl chloride, or the like can be used. Among these, stretched, especially biaxially stretched, polyethylene terephthalate films are preferred, since they show superior rigidity and are unlikely to be broken at the time of die cutting.

The multiple plastic films constituting one of the laminate may consist of the same material, or different materials. Moreover, biaxially stretched polyethylene terephthalate films are preferably used so that they should present on both surfaces and have another or other plastic films between them.

The surfaces of the plastic films may be subjected an easy adhesion treatment such as corona discharge treatment and easy adhesion undercoating treatment.

Each plastic film preferably has a thickness of 50 to 400 μm, more preferably 100 to 350 μm, still more preferably 150 to 300 μm. By using plastic films each having a thickness within such a range, the die cutting becomes easier to perform, and breakage during the die cutting can be prevented. Moreover, in order to prevent generation of curling, when the laminate plate consists of two of plastic films, two of the plastic films preferably have the same thickness, and when the laminate plate consists of three or more of plastic films, two of the plastic films locating the most surface sides preferably have the same thickness.

Examples of adhesive constituting the adhesive layer include pressure sensitive adhesives, hot melt type adhesives, ionizing radiation curable type adhesives, and so forth comprising compounds of natural rubber type, reclaimed rubber type, polychloroprene rubber type, nitrile rubber type, styrene/butadiene type, epoxy type, urethane type, acrylic type, acrylate type, and so forth. Among these, ionizing radiation curable type adhesives are preferably used, which can enhance rigidity of the protection plate by curing while absorbing impact at the time of die cutting.

The adhesive layer may contain additives such as leveling agents, ultraviolet absorbers and anti-oxidants.

The adhesive layer preferably has a thickness of 5 to 100 μm, more preferably 10 to 40 μm, still more preferably 15 to 30 μm. Impact at the time of die cutting can be absorbed with a thickness of 5 μm or larger, and breakage of ends of adhesive layers and delamination of the adhesive layers and plastic films at the interfaces at the time of die cutting can be prevented with a thickness of 100 μm or smaller.

Examples of the method for forming the adhesive layer include a method of preparing a coating solution or dispersion by dissolving or dispersing constituents of the layer in an appropriate solvent, applying the coating solution on a support by a known method such as roll coating, bar coating, spray coating and air knife coating, and drying the coated solution or dispersion.

For adhering the plastic films, an adhesive (coating solution or dispersion prepared as described above) can be applied on one of the plastic films and dried to form an adhesive layer, and another plastic film can be adhered to the coated surface. When an ionizing radiation curable type adhesive is used as the adhesive, ionizing radiation is irradiated after adhering the plastic films to cure the adhesive layer.

After a laminate plate is prepared by adhering at least two or more of plastic films via the adhesive layer or layers, the laminate plate is subjected to die cutting to obtain the protection plate.

The die cutting can be performed by a conventionally known method, for example, using a die cutting machine provided with a Thompson blade die (BIKU blade die). In the present invention, since die cutting is performed by using a die cutting machine as described above, simultaneous processing of two or more plates or a large area is possible, machining time becomes short even if the thickness is made thicker, and therefore production efficiency can be improved compared with laser cutting. Moreover, since a laminate plate having a specific structure is used as described above, the laminate plate does not break at the time of the die cutting.

The laminate plate preferably has a hard coat layer on at least one surface. By providing a hard coat layer, rigidity of the plate can be enhanced, and by using the surface protection plate as a surface protection plate for liquid crystal displays with the surface of the hard coat layer side as the surface, scratch-proof property can be imparted to the surface protection plate.

The hard coat layer can be formed with heat curable type resins, ionizing radiation curable type resins and so forth such as polyester type resins, acrylic type resins, acrylate/urethane type resins, polyester acrylate type resins, polyurethane acrylate type resins, epoxy acrylate type resins, urethane type resins, epoxy type resins, polycarbonate type resins, melamine type resins, phenol type resins and silicone type resins. Among these resins, ionizing radiation curable type resins which can enhance rigidity of the surface protection plate by curing are preferably used. Moreover, it is preferable to add a matting agent to the hard coat layer for prevention of reflection of outer lights. The hard coat layer preferably has a thickness of 2 to 15 μm.

The hard coat layer may contain additives such as leveling agents, ultraviolet absorbers and anti-oxidants. The hard coat layer can be formed by coating and drying on the laminate in the same manner as that of the formation method of the adhesive layer. The formation of the hard coat layer is preferably performed, but not limited to, before the die cutting. The hard coat layer can be thereby easily formed, and generation of scratches on the surface protection plate during the die cutting or the like can be thereby prevented.

Hereafter, the method for producing a liquid crystal display of the present invention will be explained.

The method for producing a liquid crystal display of the present invention comprises producing a surface protection plate for liquid crystal displays by the method for producing a surface protection plate for liquid crystal displays of the present invention described above, and installing the surface protection plate as a surface protection plate for protecting a display surface of a liquid crystal display.

An embodiment of a liquid crystal display to which the present invention is applied is shown in FIG. 1. This liquid crystal display 6 comprises a liquid crystal cell 1 consisting of glass substrates 11 and a liquid crystal 12, polarizing plates 2, a backlight 3 and a case 4, and has a configuration that a surface protection plate 5 produced by the method for producing a surface protection plate for liquid crystal displays of the present invention is further installed on the display surface. The surface protection plate 5 is installed by, for example, incorporating it into a frame of the case 4 as shown in FIG. 1.

As the members constituting the liquid crystal display other than the surface protection plate, conventionally known members can be used. The liquid crystal display to which the method for producing a liquid crystal display of the present invention is applied is not limited to the liquid crystal display of FIG. 1, and the method can be applied to various kinds of liquid crystal displays such as liquid crystal displays comprising elements other than the elements shown in FIG. 1, so long as it is applied to those having a surface protection plate.

The method for producing a liquid crystal display of the present invention described above enables easy production of a liquid crystal display not showing blur of images due to deflection of surface protection plate at the time of touching on the display surface and unlikely to suffer from breakage of the surface protection plate by impact in spite of use of a thin surface protection plate having.

EXAMPLES

Hereafter, the present invention will be further explains with reference to examples. The term and symbol "part" and "%" are used weight basis, unless especially indicated.

Example 1

On a transparent polyester film having a thickness of 250 μm (Lumirror T60, Toray Industries, Inc.), a coating solution for adhesive layer having the following composition was applied by bar coating so as to obtain a dry thickness of 20 μm, and dried. Then, another transparent polyester film having a thickness of 250 μm (Lumirror T60, Toray Industries, Inc.) was adhered on the adhesive layer, and the adhesive layer was cured by ultraviolet irradiation. Subsequently, on one of the transparent polyester films, a coating solution for hard coat layer having the following composition was applied by bar coating so as to obtain a dry thickness of 5 μm, dried, and subjected to ultraviolet irradiation to produce a laminate plate. Then, the laminate plate was subjected to die cutting by using a die cutting machine having a Thompson blade die to obtain a surface protection plate for liquid crystal displays.

<Coating Solution for Adhesive Layer>

| | |
|---|---|
| Ionizing radiation curable type adhesive (BEAMSET 575, Arakawa Chemical Industries, Ltd.) | 5 parts |
| Isopropyl alcohol | 20 parts |

<Coating Solution for Hard Coat Layer>

| | |
|---|---|
| Ionizing radiation curable type resin (DIABEAM UR6530, Mitsubishi Rayon Co., Ltd.) | 58 parts |
| Photopolymerization initiator (Irgacure 651, Ciba Speciality Chemicals Inc.) | 1.8 parts |
| Methyl ethyl ketone | 80 parts |
| Toluene | 60 parts |
| Ethyl cellosolve | 7 parts |

Example 2

A surface protection plate for liquid crystal displays was obtained in the same manner as that of Example 1 except that both of the two transparent polyester films having a thickness of 250 μm were changed to transparent polyester films having a thickness of 188 μm (Lumirror T60, Toray Industries, Inc.).

Example 3

A surface protection plate for liquid crystal displays was obtained in the same manner as that of Example 1 except that both of the two transparent polyester films having a thickness of 250 μm were changed to transparent polyester films having a thickness of 125 μm (Lumirror T60, Toray Industries, Inc.).

Example 4

On one surfaces of two transparent polyester films having a thickness of 188 μm (Lumirror T60, Toray Industries, Inc.), the same coating solution for adhesive layer as that of Example 1 was coated on each by bar coating so as to obtain a dry thickness of 20 μm, and dried to obtain two adhesive films. Then, the obtained two adhesive films were adhered to different surfaces of a transparent polyester film having a thickness of 188 μm (Lumirror T60, Toray Industries, Inc.), and the adhesive layers were cured by ultraviolet irradiation. Subsequently, a hard coat layer was formed on one of the transparent polyester films in the same manner as that of Example 1 to produce a laminate plate. Then, the laminate plate was subjected to die cutting by using a die cutting machine provided with a Thompson blade die to obtain a surface protection plate for liquid crystal displays.

Example 5

A surface protection plate for liquid crystal displays was obtained in the same manner as that of Example 4 except that both of the two transparent polyester films on the surface sides among the three transparent polyester films having a thickness of 188 μm were changed to transparent polyester films having a thickness of 100 μm (Lumirror T60, Toray Industries, Inc.).

Example 6

A surface protection plate for liquid crystal displays was obtained in the same manner as that of Example 4 except that all the three transparent polyester films having a thickness of 188 μm were changed to transparent polyester films having a thickness of 100 μm (Lumirror T60, Toray Industries, Inc.).

Example 7

A surface protection plate for liquid crystal displays was obtained in the same manner as that of Example 4 except that both of the two transparent polyester films on the surface sides among the three transparent polyester films having a thickness of 188 μm were changed to transparent polyester films having a thickness of 50 μm (Lumirror T60, Toray Industries, Inc.).

Example 8

On one surfaces of two transparent polyester films having a thickness of 50 μm (Lumirror T60, Toray Industries, Inc.), the same coating solution for adhesive layer as that of Example 1 was coated on each by bar coating so as to obtain a dry thickness of 50 μm, and dried to obtain two adhesive films. Then, the obtained two adhesive films were adhered to different surfaces of a transparent polycarbonate film having a thickness of 300 μm (Panlite, Teijin Chemicals Co., Ltd.), and the adhesive layers were cured by ultraviolet irradiation. Subsequently, a hard coat layer was formed on one of the transparent polyester films in the same manner as that of Example 1 to produce a laminate plate. Then, the laminate plate was subjected to die cutting by using a die cutting machine provided with a Thompson blade die to obtain a surface protection plate for liquid crystal displays.

Comparative Example 1

A surface protection plate for liquid crystal displays was obtained in the same manner as that of Example 1 except that both of the two transparent polyester films having a thickness of 250 μm were changed to transparent polyester films having a thickness of 100 μm (Lumirror T60, Toray Industries, Inc.).

Comparative Example 2

A surface protection plate for liquid crystal displays was obtained in the same manner as that of Example 4 except that, among the three transparent polyester films having a thickness of 188 μm, the one transparent polyester film serving as the core layer was changed to a transparent polyester film having a thickness of 350 μm (Lumirror S10, Toray Industries, Inc.), and the two transparent polyester films on the surface sides were changed to transparent polyester films having a thickness of 250 μm (Lumirror T60, Toray Industries, Inc.).

Comparative Example 3

A surface protection plate for liquid crystal displays comprising one transparent polyester film was obtained by forming the same hard coat layer as that of Example 1 on a transparent polyester film having a thickness of 188 μm (Lumirror T60, Toray Industries, Inc.).

Comparative Example 4

A surface protection plate for liquid crystal displays comprising one transparent polyester film was obtained by forming the same hard coat layer as that of Example 1 on a transparent polyester film having a thickness of 350 μm (Lumirror S10, Toray Industries, Inc.).

The surface protection plates for liquid crystal displays obtained by the production methods of Examples 1 to 8 and Comparative Examples 1 to 4 were evaluated for the following items. The results are shown in Table 1.
(1) Processing Suitability
A result that a plate was not broken at all during the die cutting using a die cutting machine is indicated as "○", and a result that a plate was partially broken is indicated as "X".
(2) Rigidity
Each of the surface protection plates for liquid crystal displays obtained by the production methods of Examples 1 to 8 and Comparative Examples 1 to 4 was incorporated into a cellular phone (P901i, NTT DoCoMo) as a surface protection plate for liquid crystal displays so that the hard coat layer should be on the surface side. The results obtained when the surface protection plate was touched with a finger are indicated with the following symbols: "⊚": no blur was observed even when the plate was pushed with a finger, "○": slight blur was observed when the plate was pushed with a finger, but no blur was observed when the plate was just touched with a finger, "Δ": slight blur was observed when the plate was touched with a finger, and "X": marked blur was observed when the plate was touched with a finger.

TABLE 1

|  | Number of plastic films/total thickness | Processing suitability | Rigidity |
| --- | --- | --- | --- |
| Example 1 | 2 Films/500 μm | ○ | ⊚ |
| Example 2 | 2 Films/376 μm | ○ | ⊚ |
| Example 3 | 2 Films/250 μm | ○ | Δ |
| Example 4 | 3 Films/564 μm | ○ | ⊚ |
| Example 5 | 3 Films/388 μm | ○ | ⊚ |
| Example 6 | 3 Films/300 μm | ○ | ○ |
| Example 7 | 3 Films/288 μm | ○ | Δ |
| Example 8 | 3 Films/400 μm | ○ | ⊚ |
| Comparative Example 1 | 2 Films/200 μm | ○ | X |
| Comparative Example 2 | 3 Films/850 μm | X | ⊚ |
| Comparative Example 3 | 1 Film/188 μm | ○ | X |
| Comparative Example 4 | 1 Film/350 μm | X | ⊚ |

As clearly seen from the results mentioned above, according to the methods for producing a surface protection plate for liquid crystal displays of Examples 1 to 8, surface protection plates having a superior rigidity could be easily produced even with a smaller thickness, and the laminate plates serving as original plates of the surface protection plates were not broken during the production in spite of the superior rigidity.

In particular, since the total thickness of the plastic films and thickness of each plastic film of the surface protection plates produced in Examples 1, 2, 4, 5 and 8 were within the suitable ranges, they had a rigidity suitable for liquid crystal displays.

On the other hand, in Comparative Example 1, a surface protection plate having sufficient rigidity could not be produced, since the total thickness was as small as 200 μm, although two plastic films were adhered.

In Comparative Example 2, the plate was broken during the die cutting, since the total thickness of the plastic films was too large, although three plastic films were adhered.

In Comparative Example 3, sufficient rigidity could not be obtained, since one plastic film having a thickness not so large was used.

The plate of Comparative Example 4 could not absorb impact with an adhesive layer unlike the plates of the examples, since it used one plastic film having a large thickness, and the plate was broken during the die cutting.

EXPLANATION OF NUMERAL SYMBOLS

Figure 1:
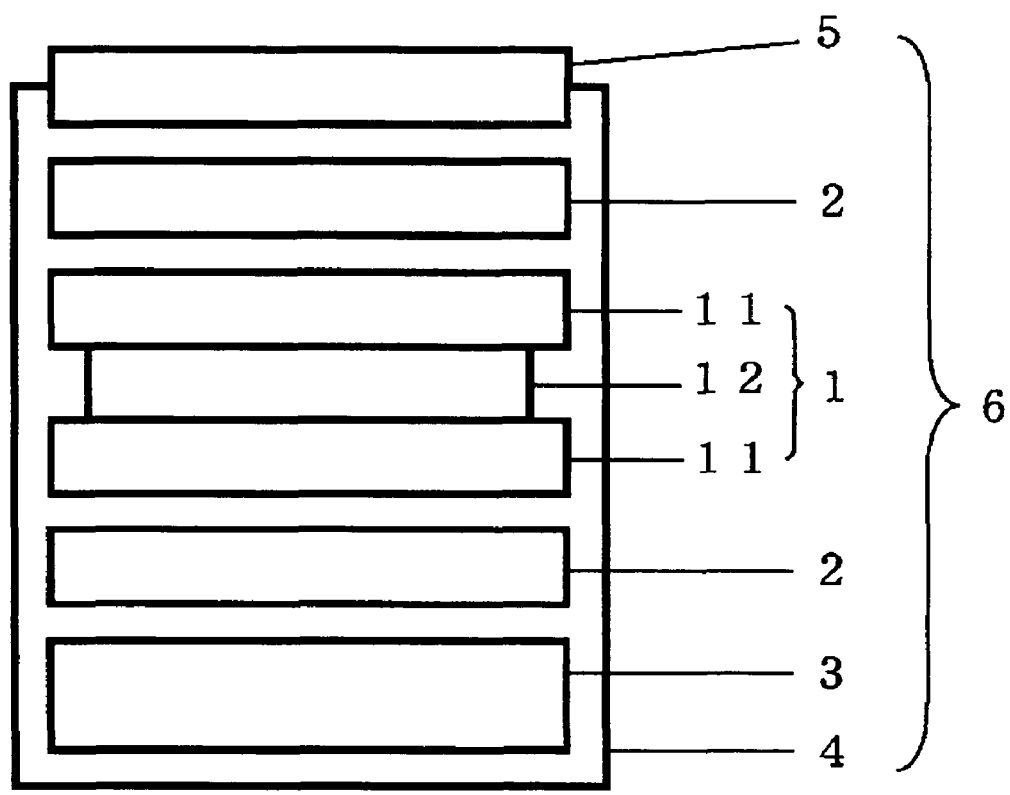
FIG. 1 A sectional view showing an example of use of a surface protection plate produced by the method for producing a surface protection plate for liquid crystal displays of the present invention.

1 . . . Liquid crystal cell
2 . . . Polarizing plate
3 . . . Backlight
4 . . . Case
5 . . . Surface protection plate for liquid crystal displays
6 . . . Liquid crystal display

The invention claimed is:

1. A method for producing a surface protection plate for a liquid crystal display enclosed within a case frame, the method comprising:

adhering at least two plastic films via an adhesive layer or adhesive layers, each plastic film being formed of polyethylene terephthalate material and biaxially stretched, the adhesive layer or each of the adhesive layers having a thickness of 5-100 μm;

curing the adhesive layer or adhesive layers to prepare a laminate plate having a total thickness of the plastic films of 250 to 700 μm;

die-cutting the laminate plate to obtain a surface protection plate; and installing the surface protection plate within the case frame, thereby forming the liquid crystal display inclusive of the surface protection plate providing a display surface.

2. The method for producing a surface protection plate for a liquid crystal display according to claim 1, wherein the at least two plastic films each have a thickness of 50 to 400 μm.

3. The method for producing a surface protection plate for a liquid crystal displays according to claim 1, wherein three of the plastic films are used in the adhering step.

4. The method for producing a surface protection plate for a liquid crystal displays according to claim 1, wherein two plastic films forming outermost opposing surfaces of the surface protection plate have the same thickness.

* * * * *